Aug. 28, 1923. 1,466,307
L. J. LE PONTOIS
SYSTEM OF GENERATING AND DISTRIBUTING ELECTRIC CURRENTS
Filed June 28, 1915   5 Sheets-Sheet 1

Aug. 28, 1923.

L. J. LE PONTOIS 1,466,307

SYSTEM OF GENERATING AND DISTRIBUTING ELECTRIC CURRENTS

Filed June 28, 1915 5 Sheets-Sheet 4

Patented Aug. 28, 1923.

1,466,307

UNITED STATES PATENT OFFICE.

LÉON J. LE PONTOIS, OF LAKEWOOD, OHIO, ASSIGNOR, BY MESNE ASSIGNMENTS, TO THE TEAGLE COMPANY, OF CLEVELAND, OHIO, A CORPORATION OF OHIO.

SYSTEM OF GENERATING AND DISTRIBUTING ELECTRIC CURRENTS.

Application filed June 28, 1915. Serial No. 36,673.

*To all whom it may concern:*

Be it known that I, LÉON J. LE PONTOIS, a citizen of the Republic of France, residing at Lakewood, in the county of Cuyahoga and State of Ohio, have invented certain new and useful Improvements in and Relating to Systems of Generating and Distributing Electric Currents, of which the following is a specification.

This invention relates to a system of generating and distributing electric currents and more particularly it has to do with the generation and distribution of electric currents for use on motor vehicles having internal combustion motors. It also relates and pertains to the apparatus by means of which high tension currents or sparks are generated for ignition purposes.

The general introduction in the motor vehicle chassis of the direct current generator for such purposes as electric lighting, electric horn operation and for charging electric storage batteries has been responsible to a large extent for the return to so called battery ignition for the internal combustion motor through the intermediary of an induction coil.

In some cases the primary circuit breaker and high tension current distributor for the battery system have been incorporated in a unitary structure with the direct current dynamo, the breaker and distributor being operated from the armature shaft at the proper time for the ignition of the internal combustion motor, and even the induction coil itself has been incorporated in this unitary structure. This combination results in a saving of space under the motor hood and weight, as compared with a system including a direct current generator and an independent magneto of the permanent magnet type for ignition purposes. The battery system as known today does not possess the heat value of igniting sparks, and essentially the sustained heat value, which is inherent in the characteristic high tension spark generated by a direct high tension magneto of the permanent magnet type. In order to obtain thorough and rapid ignition within the cylinder of an internal combustion engine, so indispensable for the efficient conversion of the energy of the combustion of the fuel into mechanical work, the resistance that the dielectric opposes to current flow between the spark terminals in a cylinder must first be punctured by a high tension spark and the current value at the instant of puncture maintained or increased during the period of time necessary to insure the ignition of as much of the combustible material as is required to secure the most beneficial and efficient results. For this reason the direct high tension magneto may be said to generate a spark having a sustained current value during the period of time necessary for thorough ignition as contradistinguished from and preferable to battery ignition in which current in the secondary winding of an induction coil is induced merely by the collapse of a magnetic field and without the expenditure upon the magnetic circuit of the mechanical energy required to give such sustained current value to the resulting ignition spark. However, the bulk presented by the permanent magnets of a high tension magneto of the permanent magnet type and the expense of construction is generally such as to render commercially impractical its combination with a direct current generator in a unitary structure, and the expense of a separate direct current generator with its driving connections to the motor and an independent high tension magneto with its driving connections to the motor, as compared with the expense of a direct current generator and the necessary mechanism for connecting up and operating one of the well known forms of battery system, is such as to make in many installations the expense of the former practically prohibitive.

One of the objects of my invention has been to provide a system of direct current generation and high tension current generation which may be encompassed in substantially the space occupied by the so-called battery systems of today or even in smaller space, and in which undesirable characteristics of such battery systems will be avoided and desirable characteristics of the direct high tension magneto systems incorporated, and in which the high tension sparks generated will have sustained values as compared with the ignition sparks with substantially unsustained values as produced with the so-called battery systems using induction coils; or in other words my improved system will produce sparks having the same time-temperature characteristics as those produced by the so-called direct high tension magnetos, namely a temperature that suddenly rises to a high value is maintained at this or a higher value for an appreciable time necessary to insure proper and efficient ignition and then drops relatively slowly to its initial state.

It has also been one of the objects of my invention to materially reduce the current consumption used for the generation of ignition sparks as compared with the current consumption of the so-called battery system.

Another object of my invention has been so to correlate and co-ordinate the parts of the ignition generator that the current value of the high tension sparks generated may be regulated or controlled to a nicety, thus providing for the efficient generation of ignition sparks at relatively low engine speeds of rotation, while preventing undesirable increase in the heat value of the sparks when the engine is running at relatively high speeds.

As a matter of fact at the present time battery systems may be constructed and installed at considerably less expense than any of the well known magnetos of the permanent magnet type, and a battery system is likely to start the motor at a lower engine speed than a high tension magneto system, since with the latter the value of the spark is largely dependent upon speed of rotation, while in the battery systems the spark value is highest at low speeds of rotation of the crank shaft of the engine. One of the objects of my invention has been to design a high tension ignition generator, the high tension current characteristics of which are such as to avoid the objections of low current values at low speed incident to high tension magneto systems by providing a much higher flux density than can be obtained in a commercially practical manner, by the use of permanent magnets for field excitation.

It will be understood that the higher the speed necessary to generate an igniting spark of sufficient value to properly start the motor, the more energy is consumed in the rotation of the crank shaft and where an electrical or mechanical starting device is employed for this purpose, the less energy required to rotate the crank shaft for starting purposes, the better. I have therefore invented an apparatus and system in which ignition sparks of sustained value will be generated at low speeds so as to insure easy motor starting.

Another object of my invention has been to correlate and co-ordinate the elements of the system so that they will be both efficient and durable in connection with the ignition of internal combustion motors running at relatively high speeds and having a relatively large number of cylinders. With the so-called high tension magneto of the permanent magnet type serious mechanical and electrical difficulties have been encountered in its use with high speed multiple cylinder engines. With my invention it will be understood that the speed of rotation of the rotatable parts of my ignition generator may be materially reduced over those necessary with the high tension magnetos of today in order to get efficient and proper ignition for multiple cylinder motors at all speeds.

Another object of my invention has been to produce a system for generating and distributing sustained high tension sparks, the total weight and production cost of which will be materially less than the total weight and cost of the same system when provided with an ignition generator of the self-contained high tension permanent magnet type. And in view of the fact that permanent magnets are not used and not required in my system and apparatus, the construction, shaping, assembling and cost of necessary parts is minimized.

Another object of my invention is to provide a system of generating sustained high tension sparks in which the exciting circuit for the magnetic field is connected in parallel with two sources of direct current supply, so that in the event, for any reason, either one of such sources should be disconnected from the circuit, the other source will supply the necessary current for field excitation and the operation of the internal combustion motor will not be interfered with.

Another object of my invention is to provide an ignition system for multi-cylinder, hydro-carbon motors, for example motors having eight or more cylinders which will have advantageous characteristics of the well known permanent magnet types of magnetos of four and six cylinder motors and will avoid largely, if not entirely, the disadvantages on these multi-cylinder motors of battery ignition systems.

For the purpose of illustration I have selected to show and describe one embodiment of my invention only.

Figure 1:
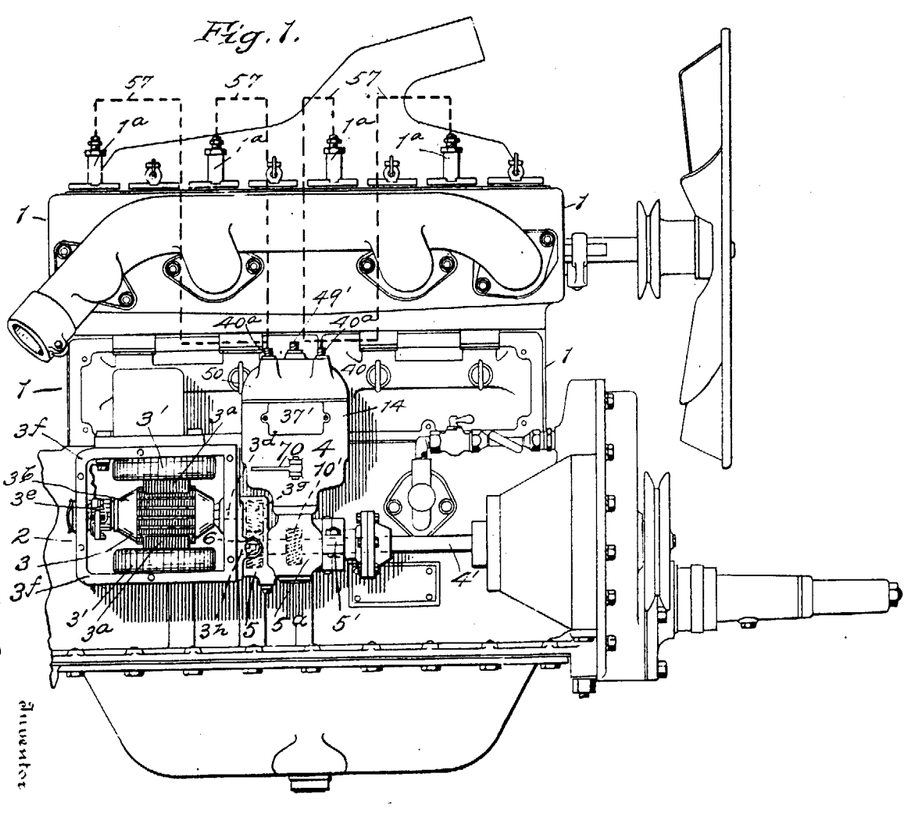
Fig. 1 shows in side elevation an internal combustion four cylinder motor with one of my combined direct current and ignition generators geared thereto, a side plate of the direct current generator being removed to show some of the interior parts.

In the drawings, 1 indicates as an entirety an internal combustion motor of any well known type. The one selected for the purpose of illustration is a four cylinder motor having four spark plugs 1ª, of any well known type, each having its spark terminals suitably positioned within the combustion chamber of one of the cylinders of the motor in any well known manner. The motor illustrated is popularly known to those skilled in the art as a Continental motor, and as my invention relates to a system of generation and distribution of electric currents, it will not be necessary to describe the various parts of the motor, other than those necessary to operate the electric generating devices.

Figure 2:
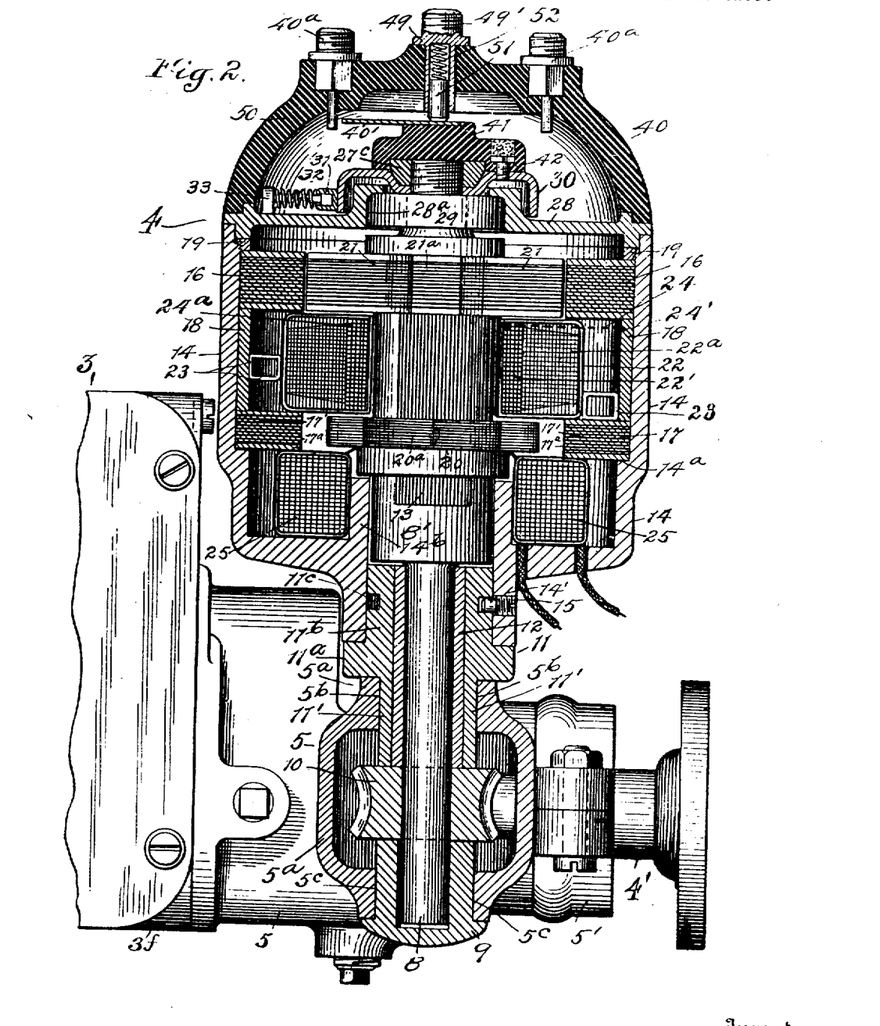
Fig. 2 is a view, showing in elevation the front portion of the direct current generator and in section the ignition generator.

2 indicates as an entirety an electric generating system embracing means for generating relatively low tension direct current and means for generating high tension ignition sparks. For the purpose of illustration I have shown these generators in a combined structure, comprising a direct current generator 3 and a high tension ignition generator 4. The direct current generator 3 may be of any well known type suitable for generating current of sufficient voltage to supply the ordinary requirements in current consumption in a motor vehicle, such as for lighting, battery charging and electric horn operation. The one illustrated is of standard construction, known to those skilled in the art as a Gray and Davis generator. For the purpose of disclosing my invention, it is only necessary to call attention to the fact that this generator has exciting windings 3' on poles 3ª, an armature 3ᵇ having an armature shaft 3ᵈ with a commutator 3ᵉ near one end thereof. The armature shaft 3ᵈ at either end is mounted in suitable bearings, not shown, in the housing 3ᶠ of the generator. The forward end of the armature shaft extends beyond the front end of the housing 3ᶠ and has secured to it a gear 3ᵍ. 4' is a shaft geared to the crank shaft of the motor in any suitable manner, not shown, so as to rotate therewith at crank shaft speed. This shaft extends rearwardly from the front end of the motor, as indicated, and is mounted at its rear end in a bearing 3ʰ and near its rear end in a bearing 5' in a gear housing 5 which is secured to the front end of the frame 3ᶠ, in any suitable manner. 6 is a gear rigidly secured to the shaft 4' and meshing with the gear 3ᵍ on the armature shaft. With the construction thus far illustrated, it will be understood that the ratio of the gear 3ᵍ to the gear 6 is one to two, so as to rotate the armature shaft at greater speed than the crank shaft of the motor, thereby enabling the use of relatively a smaller direct current generator than would be required if the armature shaft rotated at crank shaft speed.

The generator 4 is constructed to generate high tension current sparks having sustained values. For the purpose of illustration I have shown a form of my invention in which the means for generating the ignition sparks is mounted in and on the gear casing at the front end of the direct current generator 3. The gear casing is enlarged as indicated at 5ª and has formed in it vertically aligned openings 5ᵇ, 5ᶜ, to receive a rotatable shaft 8. This shaft at its lower end is mounted in a thrust bearing 9 secured to the section 5ª of the gear casing.

10 is a gear, preferably a spiral, keyed to the shaft 8, driven by a gear 10' on the shaft 4', and bearing on its end face against the upper edge of the thrust bearing 9. 11 is an element having a portion 11' snugly fitted into the bearing 5ᵇ in the enlarged portion 5ª and bearing at its lower end against the upper side of the gear 10. This element 11 has a flange 11ª which rests upon the top wall of the casing enlargement 5ª and an upwardly extending tubular portion 11ᵇ. The shaft 8 is mounted at its lower end in the bearing piece 9, and above the gear 10 in a bushing 12 fitted into the element 11. At its upper end the shaft 8 carries an enlarged portion 8' which is recessed to receive a plurality of laminæ 13 at that portion of the shaft where change in density of magnetic flux periodically takes place during the operation of the generator. I have illustrated the gear ratio of gears 10 and 10' to be such as to cause the shaft 8 to rotate at one half crank shaft speed.

14 is a tubular casing of iron or other magnetic material. At its lower end it has a portion 14' somewhat reduced in size, the lower wall of which rests upon the upper wall of the flange 11ª. The parts 11 and 14 are held against vertical displacement relative to each other by means of a pin and groove connection, the section 11ᵇ being shown grooved at 11ᶜ and the portion 14' carrying a screw threaded pin 15, the inner end of which is disposed to engage with the walls of the groove 11ᶜ.

Figure 3:
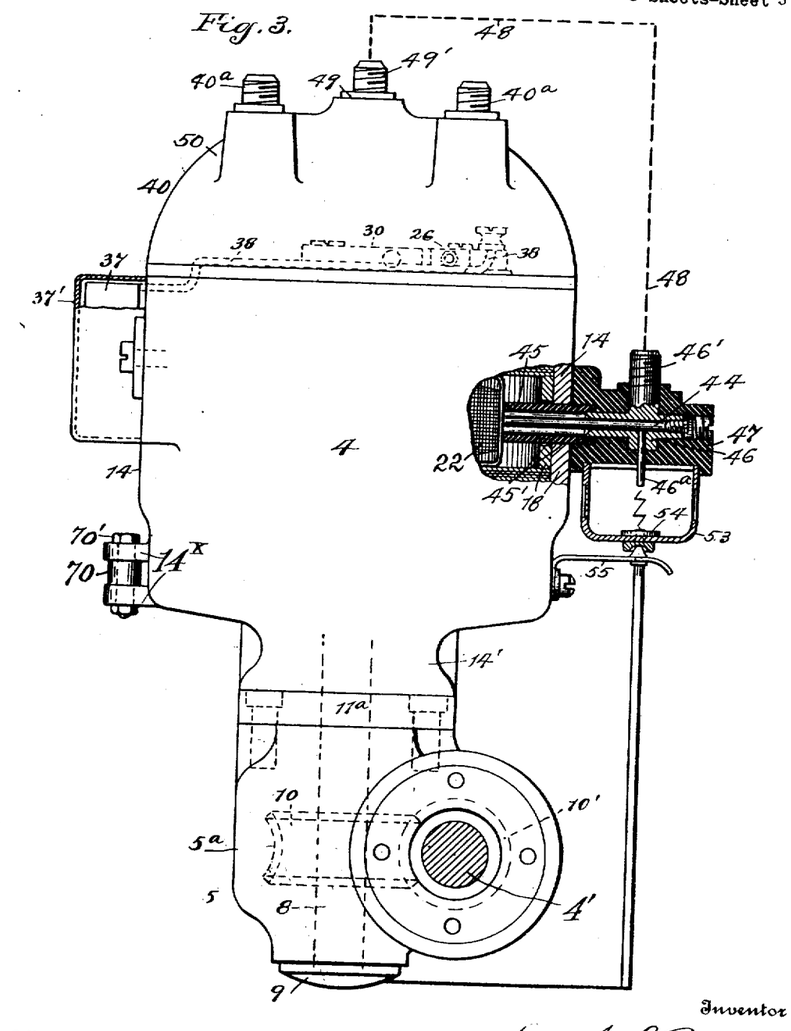
Fig. 3 is a view partly in end elevation and partly in section of the ignition generator.

17 is a pole piece formed of laminæ of magnetizable material and supported by the shoulder or seat 14ª of the section 14. 16 is a pole piece formed of laminated material, disposed above the pole piece 17 and spaced therefrom by the spacing collar 18 of magnetic material. The ring 19 is screw threaded into the section 14 and engages the upper side of the pole piece 16, so as to hold the pole pieces 16 and 17 properly spaced relative to each other. The ignition generator shown is intended for igniting the four cylinder motor 1 and, preferably accordingly the pole pieces 16 and 17 are each provided with four polar projections 16' equally spaced apart about the axis of the rotor 8, each of the polar projections having a polar face 16ª formed in the arc of a circle struck from the axis of the shaft 8 as a center.

Figure 5:
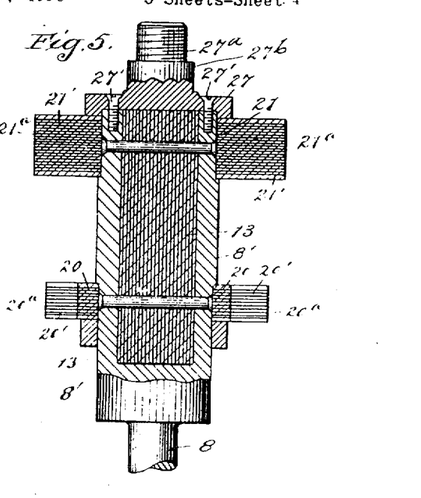
Fig. 5 shows the rotor partly in section and partly in side elevation, the high tension coil being removed.

21 is a flux distributor on the shaft 8 preferably formed of laminæ of magnetizable material, secured to the rotor 8 about its laminated section 13 and held in magnetic contact therewith. This flux distributing section has four outwardly extending radially disposed polar projections 21', each having a polar face 21ª formed in the arc of a circle struck from the axis of the shaft 8 as a center and disposed to travel in a path closely adjacent to the polar faces 16ª of the pole piece 16.

20 is a flux distributing section likewise carried by the shaft 8 formed of laminæ of magnetizable material and held in contact with the laminated section of the shaft 8 and having four outwardly extending radially arranged polar projections 20', each having a polar face 20ª disposed to travel in a path closely adjacent to the polar faces 17ª of the pole piece 17.

22 is an ignition generating winding, preferably comprising a relatively coarse wire section 22', the primary winding, which is surrounded by a relatively fine wire section 22ª, the secondary winding. This high tension coil is suitably insulated and supported between the adjacent sides of the pole pieces 16 and 17 against movement axially of the shaft 8. To prevent movement of the coil radially of the shaft 8, suitable spacers 23, interposed between the outer wall of the coil and the inner wall of the spacing collar 18, may be employed.

One terminal 24 of the primary winding may be grounded to the frame 14 as indicated at 24'. The other end of the primary winding may be connected to one end, preferably the inner end, of the secondary winding, as indicated at 24ª.

The frame 14 carries an upwardly extending tubular boss 14ᵇ about which is disposed a suitable exciting winding 25.

Any suitable and well known type of circuit opening and closing mechanism may be employed for periodically closing and opening the circuit of the primary winding 22', and likewise any well known type of distributor for distributing high tension current impulses from the secondary winding to the cylinders of the motor in proper sequence may be used. For the purpose of illustration I have shown a circuit opening and closing mechanism indicated in an entirety at 26.

27 is a plate secured, as by means of screws 27', to the upper end of the rotor shaft 8 and having a screw threaded end 27ª. 28 is a circular plate detachably mounted upon the upper end of the frame 14 and having at its center a recess 28ª to receive an anti-friction bearing 29, which is fitted about the section 27ᵇ at the upper end of the shaft 8 and serves to properly support the upper end of the shaft 8.

Figure 4:
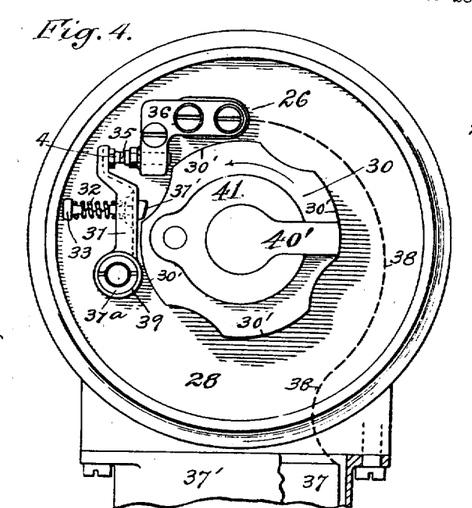
Fig. 4 is a top plan view of Fig. 2 with distributor removed showing part of condenser case in section.

30 is the cam of the circuit opening and closing mechanism 26, it being secured to the screw threaded section 27ª by a nut 27ᶜ. This cam has four surfaces 30' each adapted to engage with a shoe 31' carried by a breaker arm 31, pivotally mounted at 31ª on the plate 28. The free end of this breaker arm is normally pressed toward the cam by means of a spring 32, having one end engaging with the breaker arm and its other end bearing against a lug 33 carried by the plate 28. At its free end this breaker arm carries a breaker electrode 34. 35 is a co-operating, normally stationary electrode, adjustably mounted in a bracket 36 carried by and suitably insulated from the plate 28. 37 is a suitable condenser disposed in a box 37' detachably connected to the frame 14. One terminal of this condenser is electrically connected to the electrode 35 as by means of an electric conductor 38, the other terminal of the condenser being grounded as indicated at 38'.

For the purpose of illustration I have shown a distributor 40 which comprises a distributor arm 40' secured to and insulated from the upper end of the shaft 8, so as to rotate therewith, as by means of an insulated block 41 secured to the cam 30 in any suitable manner, as by means of screws 42 countersunk and having their heads covered by suitable insulating material. The outside terminal of the high tension winding 22ª is electrically connected with a conductor 44, which extends outwardly through an insulating tube 45, supported by the walls of aligned openings 45' through the outer wall of the frame 14 and the spacing collar 18.

46 is a metallic socket carried by an insulating piece 47, suitably secured to the frame 14, so that the socket 46 will be in axial alignment with the terminal tube 45. The socket 46 has a pair of laterally extending terminals 46', 46ª. The former is electrically connected by means of a conductor 48 with the terminal 49' of a socket piece 49 carried by the distributor cap 50 of insulating material. This socket piece 49 carries a brush 51 pressed by a spring 52 against the distributor arm 40′ in line with the axis of the shaft 8.

The arm 46ᵃ terminates at its lower end in a perforated metallic cup 53, being suitably disposed from a metallic button 54 carried by the lower wall of said box, so as to form a safety spark gap therebetween, the button 54 being grounded to the frame 14 by a spring member 55 secured to the frame 14 and which also serves to hold the box 53 detachably in position.

40ᵃ are distributor terminals carried by the distributor cap 50 and suitably disposed with reference to the axis of the shaft 8 so as to properly distribute high tension current impulses to the cylinders of the motor 1. 57 are electrical conductors, each extending from one of the distributor terminals 40ᵃ to a spark plug 1ᵃ in one of the motor cylinders and having electrical connection with one terminal of such spark plug, the other terminal of which is grounded in a well known manner.

60 is a secondary or storage battery, having one terminal 60′ connected by an electrical conductor 61 to one terminal 62′ of an automatic cut-out 62, voltage controlled, the other terminal 62ᵃ of which cut-out is connected by the electrical conductor 63 with one of the brushes or set of brushes 3ᶜ of the direct current generator 3. 64 is an electrical conductor connecting the other brush or brushes of the direct current generator with the terminal 60ᵃ of the storage battery. 65 is an electrical conductor connecting the terminal 60ᵃ of the storage battery and one brush or set of brushes of the direct current generator to one terminal 25′ of the exciting winding 25, the other terminal 25ᵃ of which, when the ignition generator is in operation, being electrically connected to the terminal 60′ of the storage battery and also preferably to the other brush or brushes of the direct current generator. One method of establishing electrical connection between the terminal 25ᵃ of the exciting winding and the terminal 60′ of the battery, I have shown in Fig. 8, it consisting of an electrical conductor 66 connected at one end to the terminal 25ᵃ and at its other end to the movable part 67′ of a suitable switch 67, having three positions 67ᵃ, 67ᵇ and 67ᶜ. When the movable section 67′ of the switch 67 is in the position 67ᵃ, the circuit between the battery and the exciting winding and also between the generator and the exciting winding is open. When the movable section 67′ of the switch 67 makes contact with the terminal 67ᵇ, the exciting winding is connected in electric circuit with the battery and also with the direct current generator through a resistance 68, which resistance, as indicated, may be a variable one. When the movable element 67′ of the switch 67 makes contact with the terminal 67ᶜ, electrical connection between the battery exciting winding is established, without the interposition of an external resistance in the circuit.

Figure 8:
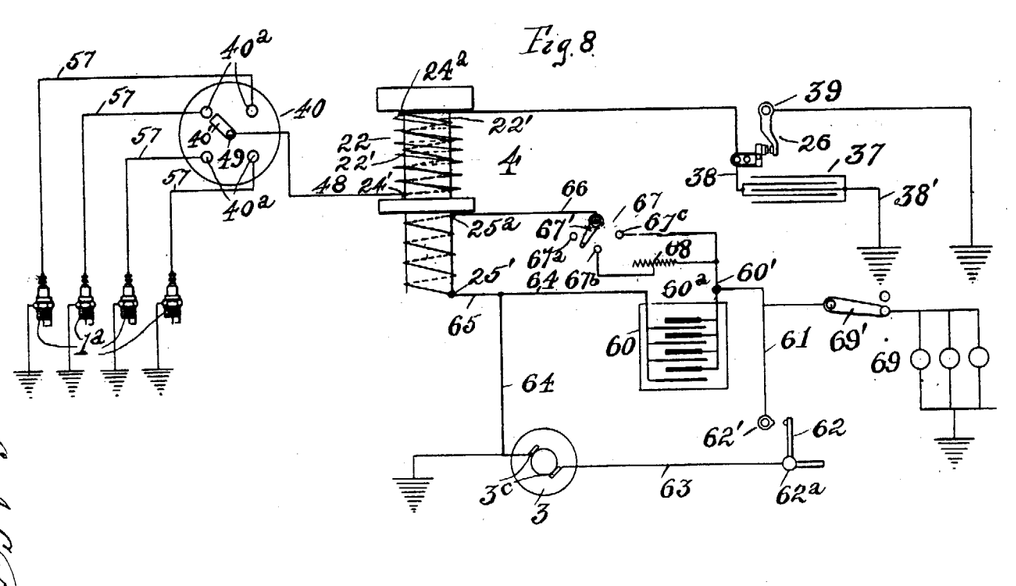
Fig. 8 is a diagrammatic view of the electrical circuit.

In Fig. 8 I have also shown diagrammatically the electrical connections for the windings, breaker and condenser in the ignition generator.

The rotor may be considered as comprising the shaft 8 with its enlarged section 8′ and the flux distributing sections 20 and 21 carried thereby.

The operation of the system will be readily understood. When it is desired to start the motor, its crank shaft is caused to rotate in the proper direction in any suitable manner, the electrical circuit between the storage battery 60 and the exciting winding having been established through the switch 67. As at this time there will be substantially no voltage generated by the direct current generator, the automatic cut-out 62 will have opened the circuit between the generator and the storage battery, and the storage battery itself will furnish the necessary current to properly excite the winding 25. A magnetic field is consequently set up within the ignition generator, the flux of which finds a path of least reluctance through the central annular pole 14ᵇ and enlarged and laminated portion of the rotor, through one or both flux distributing sections on the rotor, through one or both pole pieces 16, 17, and the frame 14 back to the annular central pole 14ᵇ.

Figure 6:
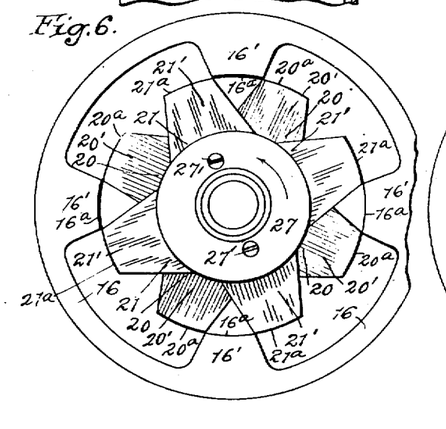
Fig. 6 is a top plan view of Fig. 2 with plate 28 with everything thereabove removed and the generating coil also removed for sake of clearness.
Figure 7:
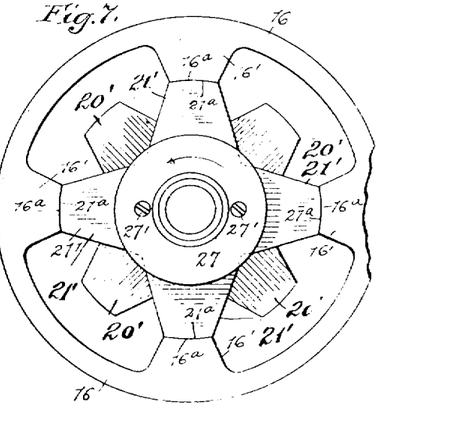
Fig. 7 is the same as Fig. 6, but having the rotor in a different position.

Assuming that the rotor occupies the position shown in Fig. 7 with the flux distributing section 21 having its polar faces 21ᵃ, each substantially in registry with a polar face 16ᵃ of the pole piece 16, the path of least reluctance for the magnetic circuit through the winding 22 is a minimum and the density of the flux threading through the winding reaches a maximum. The relation between the cam 30, shoe 31′ and rotor 8 is such that the breaker now closes the circuit of the primary winding 22′, so that this winding is short-circuited upon itself, and as the rotor continues to rotate in the direction indicated by the arrow in Fig. 7, the reluctance of the magnetic circuit threading through the coil 22 will tend to increase, since the polar faces 21ᵃ are leaving the polar faces 16ᵃ, which will result in a decrease of the density of magnetic flux threading through the coil, whereupon current is generated in the primary thereof, which according to Lenz law tends to oppose such decrease, the magneto-motive force of this current tending to prevent the decrease in flux threading through the coil. When the rotor in its motion has reached substantially the position shown in Fig. 6, the edges of the polar faces 21ᵃ are on the verge of leaving the edges of the polar faces of the pole piece 16', while the edges of the polar faces 20ª of the lower flux distributing sections 20 of the rotor are approaching the edges of the polar faces 17ª of the lower pole piece. As the path of least magnetic reluctance is now outside the coil, there will be a marked tendency of the magnetic flux through the coil to decrease in density, which, however, is opposed by the fact that the primary winding is short-circuited upon itself. When the rotor has reached a certain point in its cycle of rotation, the circuit of the coarse wire winding is suddenly opened by the cam 30, moving the breaker arm 31 so as to interrupt the circuit between the breaker electrodes 34 and 35, whereupon owing to the interruption of the current a sudden flux decrease takes place and a high tension voltage is set up across the terminals of the spark plug 1ª, then in the electric circuit of the secondary ignition winding. This voltage reaches such a value that it punctures the dielectric between the terminals of the spark plug and causes a spark to jump therebetween. The flux decrease through the winding 22 continues due to the increasing reluctance of the magnetic circuit through the coil produced by the further movement of the flux distributing section 21 away from the pole faces 16ª, to accomplish which mechanical energy must be supplied by the driving mechanism, and accordingly the arc formed between the terminals of the spark plug is sustained or maintained for a sufficient period of time to insure proper and complete combustion of the gases within the engine chamber.

The automatic cut-out 62 may be of any well known construction, such for example as a Briggs and Stratton cut-out, well known to those skilled in the art. It should be so constructed and related in the circuit that it will instantly open the circuit should the voltage of the battery exceed that of the direct current generator 3.

Ordinarily when starting the internal combustion motor, it will probably be found desirable to excite the winding 25 to the full extent for which its circuit is designed, so that a spark of relatively high initial value at the point of break will be obtained between the spark terminals in the cylinder, despite the fact that the speed of rotation of the crank shaft and consequently of the rotor 8 is relatively low. Conditions may be found where after starting and getting the motor warmed up, it will be desirable to cut down the exciting current, and this may be done by the interposition of the resistance 68 in the circuit, as indicated, and from time to time this resistance may be varied as desired in any well known manner.

It will be noted that the exciting winding 25 is connected in parallel with the battery and the brushes of the direct current generator 3. When the generator voltage exceeds the battery voltage, the cut-out 62 will close and the generator will excite the winding 25 and whatever surplus current is generated by the direct current generator over and above that necessary to excite the winding 25 will be delivered to the storage battery 60. Should the circuit be for any reason interrupted so as to cut out the direct current generator, the battery will deliver the necessary current to the exciting winding for field excitation purposes. During the operation of the internal combustion motor, should the battery for any reason be disconnected, leaving in circuit the exciting winding and the direct current generator, the latter will energize the exciting winding sufficiently for the purposes of producing the necessary ignition sparks.

It will be noted that the ignition generator, including the circuit opening and closing mechanism, distributor and rotor, are geared to the crank shaft of the motor, so as to operate synchronously therewith for the production of the necessary ignition sparks at the proper time in the various cylinders. It is not altogether necessary that the armature of the direct current generator should operate in synchronism with the crank shaft, and as indicated in the illustrated embodiment of my invention, it is geared to rotate at a speed higher than that of the crank shaft, and its operation does not in any respect disturb the proper timing of the ignition generator.

It further will be noted that upon the opening of the primary circuit, when the ignition generator is in operation, the induced electro-motive force in the secondary is largely due to the collapse of the field set up by current flowing in the primary. This induction takes place practically instantly and is supplemented by the mechanical work done by the rotor in the magnetic field, and the high tension spark thus produced between the terminals of the spark plug is sustained or augmented in value by the farther collapse of a field within the coil due to the mechanical rotation of the flux distributor, the mechanical work necessary to cause this rotation being provided by the internal combustion motor.

As the frame 14 is rotatably mounted, it may be shifted in the necessary directions about its axis for the purpose of advancing and retarding the instant of ignition relative to the positions of the pistons in the cylinders of the internal combustion motor. As the breaker mechanism is fixed on the rotatable magnetic frame structure it always bears the same relation to the poles irrespective of the position of the structure and at the instant of low tension circuit interruption the magnetic frame and rotatable poles always bear the same mechanical and magnetic relation to each other irrespective of the position of spark advance relative to the position of the pistons in the cylinders. Moreover since there is no flux reversal the rotatable flux distributor and the laminated magnetic section within the coil always have the same polarity relative to the frame and the electro-magnetic relationship is maintained constant at all positions of advance or retard and the shape and value of the high tension wave is always the same at a given speed for any degree of advance or retard. The angular shifting of the frame 14 may be accomplished by a rod 70 pivoted at 70' between the lug 14× on the frame 14.

It will be found that with a system embodying my invention, such as illustrated and described herein, a relatively low value of exciting current is required for exciting the coil 25 requisitely to effect the generation in the high tension circuit of the desired value of spark. In fact I have found the value of the exciting current required to be many times less than that now used in the principal battery ignition systems on the market.

It will further be noted that the ignition generator is elatively compact and may readily be co-related with a lighting generator in a comparatively small space. As a matter of fact I have found it possible to produce an ignition generator embodying my invention which will be many pounds lighter than any self-contained, high tension type of magneto now on the market capable of generating at a given speed ignition current having the same value at instant of break, and also that my improved generator will be very much cheaper to construct than any of the well known types of self-contained, high tension types of magnetos.

I have found the use of any exciting coil and an ignition generator enables me to obtain a shorter and lighter magnetic circuit, a higher flux density and smaller cross-sectional area of the magnetic circuit, than is possible where permanent magnets are used, at the same time insuring that the total flux of the magnetic circuit is sufficient in amount to insure satisfactory spark generation at relatively low speeds.

To those skilled in the art of making mechanism of the class described, many alterations in construction and widely differing embodiments and applications of my invention will suggest themselves, without departing from the spirit and scope thereof. My disclosures and the descriptions herein are purely illustrative and are not intended to be in any sense limiting.

Being given a source of direct current supply, either a direct current generator or a primary or secondary electric cell or cells, a generating winding having a primary circuit of relatively coarse wire and a secondary circuit of relatively fine wire in inductive relation to each other, suitable for transforming a current of low voltage into a current of sufficiently high voltage for the production of high tension sparks for ignition purposes, and circuit closing and opening means in the said primary circuit, I amplify the effective value of the current delivered by the secondary circuit over what it would be merely by subjecting the primary to the influence of the current from said source of a direct current supply, flowing through it and being periodically interrupted, by expending mechanical energy in the system, during the generation of ignition sparks.

An external circuit including a lamp load is shown in Fig. 8, for illustrative purposes, 69' being a switch for cutting in and out this circuit.

What I claim is:

1. A system for electrical generation and distribution, comprising an internal combustion motor, a direct current electric generator driven by said motor, a high tension ignition generator having a field exciting winding, a generating winding, a rotor for varying the magnetic flux through said generating winding, a circuit breaker, and means for distributing high tension ignition current from said generating winding to said internal combustion motor, and electrical connections between the source of direct current and the exciting winding of said ignition generator, said rotor, circuit breaker and distributing means being geared synchronously to said motor, whereby the inductive influence upon said generating winding of the magnetic flux set up by the direct current flowing through said exciting winding is amplified by the expenditure of mechanical energy in the system during the generation of ignition sparks to increase the effective current value thereof.

2. A system for electrical generation and distribution, comprising an internal combustion motor, a direct current electric generator driven by said motor, a high tension ignition generator having a field exciting winding, a generating winding, a rotor for varying the magnetic flux through said generating winding, a circuit breaker, and means for distributing high tension current from said generating winding to said internal combustion motor, electrical connections between the source of direct current and the exciting winding of said ignition generator, and a storage battery connected in parallel between said direct current generator and the exciting winding of said ignition generator.

3. A system for electrical generation and distribution, comprising an internal combustion motor, a direct current electric generator driven by said motor, a high tension ignition generator having a field exciting winding, a generating winding, a rotor for varying the magnetic flux through said generating winding, a circuit breaker, and means for distributing high tension current from said generating winding to said internal combustion motor, electrical connections between the source of direct current and the exciting winding of said ignition generator, a storage battery connected in parallel between said direct current generator and the exciting winding of said ignition generator, and an electro-magnetically controlled circuit closing and opening device in the electric circuit between said direct current generator and said battery to close and open the circuit between the said generator and battery without closing or opening the circuit between said battery and the exciting winding for the ignition generator.

4. A system for electrical generation and distribution, comprising an internal combustion motor, a direct current electric generator geared to and driven by said motor, a high tension ignition generator having a field exciting winding, a generating winding, a rotatable iron section for varying the magnetic field flux through said generating winding, a circuit breaker, and a high tension current distributor, and electrical connections between said direct current generator and the exciting winding of said ignition generator, said circuit breaker, high tension distributor and rotatable iron section being geared synchronously to said motor, whereby the inductive influence upon said generating winding of the magnetic flux set up by the direct current flowing through said exciting winding is amplified by the expenditure of mechanical energy in the system during the generation of ignition sparks to increase the effective current value thereof.

5. A system for electric current generation and distribution comprising an internal combustion motor, a direct current generator geared to said motor, a secondary battery, an ignition generator having a field exciting winding, a high tension generating winding, circuit closing and opening mechanism for said generating winding and a rotatable iron section arranged to vary the magnetic field flux through said generating winding, said rotatable iron section and circuit closing and opening means being geared to said motor to operate synchronously therewith, electrical connections connecting said direct current generator, storage battery and exciting winding of said ignition generator in parallel, and electrical connections between the high tension winding and the spark terminals in said motor.

6. A system for electrical generation and distribution for a motor vehicle having an internal combustion motor, comprising a direct current electric generator geared to and driven by said motor, a pulsating current ignition generator having a field exciting winding, a high tension generating winding, a rotatable iron section for varying the magnetic field flux through said generating winding, and circuit closing and opening means for said high tension generating winding, high tension distributing means between said ignition generator and the cylinders of said motor, a storage battery, and electric connections between said direct current generator, storage battery and the exciting windings of said ignition generator connecting them in parallel, said circuit opening and closing means and rotatable iron section being geared to said motor to operate synchronously therewith, whereby the inductive influence upon said high tension winding of the magnetic flux set up by the current flowing in said direct current circuit is amplified by the expenditure of mechanical energy in the system during the generation of ignition sparks to increase the effective value thereof.

7. A system for electric generation and distribution for a motor vehicle, comprising an internal combustion motor, a direct current electric generator geared to and driven by said motor, an ignition generator having a field exciting winding, a high tension generating winding, and a rotatable iron section for varying the magnetic field flux through said high tension generating winding, circuit closing and opening means, high tension distributing means between said ignition generator and the cylinders of said motor, and electrical connections between said direct current electric generator and the exciting windings of said ignition generator, said closing and opening means, high tension current distributing means and rotatable iron section being geared to said motor to operate synchronously therewith, whereby the inductive influence upon said high tension generating winding of the magnetic flux set up by the current from said direct current generator is amplified by the expenditure of mechanical energy in the system during the generation of ignition sparks to increase the effective value thereof.

8. A system for electrical generation and distribution for a motor vehicle having an internal combustion engine, comprising a source of direct current supply, an ignition generator having a field exciting winding, a high tension generating winding, circuit opening and closing mechanism for said generating winding, a rotatable iron section for varying the magnetic field flux through said generating winding, high tension current distributing means between said ignition generator and the cylinders of said motor, and electrical connections between said source of direct current and said exciting winding of said ignition generator, said circuit opening and closing mechanism and rotatable iron section being geared to said motor to operate synchronously therewith, whereby the inductive influence upon the high tension winding of the magnetic flux set up by the current flowing in the direct current circuit is amplified by the expenditure of mechanical energy in the system during the generation of ignition sparks.

9. In a system for electric current generation and distribution, in combination, an internal combustion motor having a cylinder with spark terminals therein, means for generating direct electric current geared to operate with said motor, a high tension generating winding having primary circuit closing and opening means, an exciting winding in inductive relation to said high tension generating winding, a rotatable iron section for varying the magnetic flux from said exciting coil through said high tension generating winding, said circuit closing and opening means and rotatable iron section being geared to said motor to operate synchronously therewith, a storage battery, electrical connections connecting the generating winding of said direct current generating means, said storage battery and said exciting winding in parallel, and electrical connections between the secondary winding of said high tension generating winding and said spark terminals in the motor.

10. In a system for electric current generation and distribution, in combination, an internal combustion motor having a cylinder with spark terminals therein, means for generating direct electric current geared to operate with said motor, a high tension generating winding having primary circuit closing and opening means, an exciting winding in inductive relation to said high tension generating winding, a rotatable iron section for varying the magnetic flux from said exciting coil through said high tension generating winding, said circuit closing and opening means and rotatable iron section being geared to said motor to operate synchronously therewith, a storage battery, electrical connections connecting the generating winding of said direct current generating means, said storage battery and said exciting winding in parallel, electrical connections between the secondary winding of said high tension generating winding and said spark terminals in the motor, and an electro-magnetically controlled circuit opener and closer in the electric circuit between said direct current generating means and storage battery.

11. A system for electrical generation and distribution, comprising an internal combustion motor, a direct current electric generator driven by said motor, a high tension ignition generator having a field exciting winding, a generating winding, a rotor for varying the magnetic flux through said generating winding, a circuit breaker, and means for distributing high tension current from said generating winding to said internal combustion motor, electrical connections between the source of direct current and the exciting winding of said ignition generator, and a variable resistance in the circuit of said exciting winding, said rotor being geared synchronously to said motor, whereby the inductive influence upon said generating winding of the magnetic flux set up by the direct current flowing through said exciting winding is amplified by the expenditure of mechanical energy in the system during the generation of ignition sparks to increase the effective current value thereof.

12. In apparatus of the class described, the combination of a magnetic field structure having polar faces, a high tension ignition generating winding, a rotor having a section extending through said generating winding and flux distributing sections carried at either side of said generating winding and having polar faces which cooperate with said polar faces of said magnetic field structure, an exciting winding for said field structure, and a circuit breaker actuated by said rotor.

13. In apparatus of the class described, the combination of a magnetic field structure having polar faces, a high tension ignition generating winding, a rotor having a section extending through said generating winding and flux distributing sections carried at either side of said generating winding and having polar faces which co-operate with said polar faces of said magnetic field structure, an exciting winding for said field structure, a circuit breaker actuated by said rotor, and means for effecting relative angular movement between said field structure and rotor for spark advance and retard purposes.

14. In ignition apparatus, the combination of a field structure, a rotor, a pair of windings surrounding said rotor, one a high tension generating winding and the other a field exciting winding, and a circuit breaker controlled by the operation of said rotor.

15. In ignition apparatus, the combination of a rotor having flux distributing sections axially spaced apart thereon, a high tension generating coil disposed about said rotor between said flux distributing sections, a field structure having polar faces disposed to co-operate with the polar faces of said flux distributing sections, respectively, and an annular projection surrounding said rotor, and an exciting winding disposed about said annular projection of the field structure.

16. A system for generating intermittent high tension impulses for ignition purposes, comprising a direct current excited magnetic field, a high tension generating winding interlinked with said field, a spark gap in circuit with said generating winding, a circuit breaker by which a portion of said generating winding is periodically open circuited and short circuited on itself, and means for expending mechanical energy upon said field during the generation of a high tension current impulse, whereby said field acts directly upon said generating winding both before and during the completion of the high tension impulse and is in turn reacted upon by said impulse and by the current variations produced in said short circuited portion of said generating winding.

17. A system for generating intermittent high tension impulses for ignition purposes, comprising a field exciting winding, a high tension generating winding interlinked with the field set up by said exciting winding, a spark gap in circuit with said generating winding, a circuit breaker by which a portion of said generating winding is periodically open circuited and short circuited upon itself, means for expending mechanical energy upon said field during the generation of a high tension current impulse, and a source of direct current connected with said exciting winding, whereby the inductive influence upon said generating winding of the magnetic flux set up by the current flowing through said exciting winding is amplified by the expenditure of mechanical energy in the system during the generating of ignition sparks to increase the effective current value thereof.

18. A system for generating intermittent high tension impulses for ignition purposes, comprising a magnetic frame structure, a field winding therefor, a generating winding having coarse and fine wire sections interlinked with the magnetic field set up by said field winding, a breaker for short circuiting and opening said coarse wire section, means for expending mechanical energy upon said field during the generation of a high tension current impulse, and a source of direct current connected with said field winding, whereby upon opening the high tension generating winding controlled by the circuit breaker, the collapse of the magnetic flux caused by the interruption of the current which was flowing in the said winding, tends to induce a high tension impulse in the high tension generating winding and a low tension impulse in the exciting winding which is added to the direct current flowing in said exciting winding, and a sustained high tension spark results between the spark terminals in the circuit of the high tension winding.

19. A system for generating intermittent high tension impulses for ignition purposes, comprising a magnetic frame structure, a field winding therefor, a generating winding having coarse and fine wire sections interlinked with the magnetic field set up by said field winding, a breaker for short circuiting and opening said coarse wire section, means for expending mechanical energy upon said field during the generation of a high tension current impulse, and a source of direct current connected with said field winding, whereby the high tension winding is maintained in electromagnetic relationship with the sustained magnetic field and the mechanical energy expended upon the field at that time serves to increase the effective current value of the spark produced.

In testimony whereof I affix my signature, in the presence of two witnesses.

LÉON J. LE PONTOIS.

Witnesses:
EDWARD R. ALEXANDER,
GEO. B. PITTS.